Figure 1:
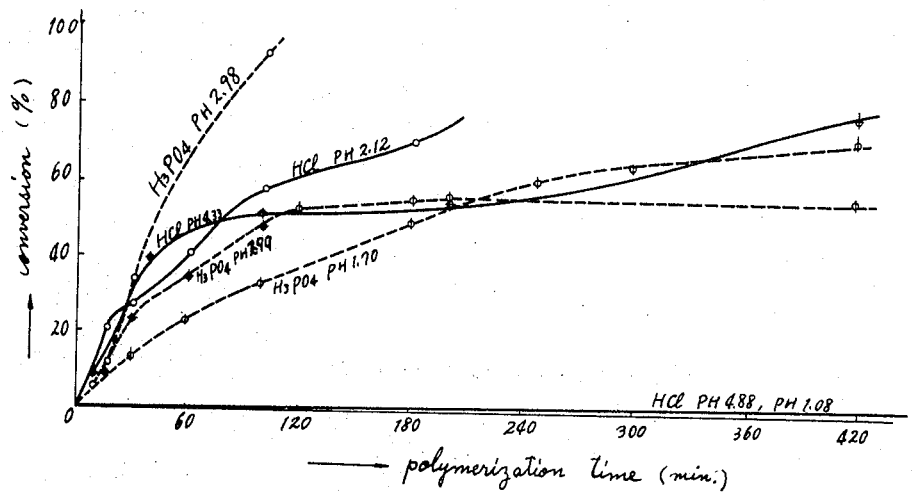

3,208,962
PROCESS FOR THE MANUFACTURE OF ACRY-
LONITRILE POLYMER SOLUTION
Masakazu Taniyama, Masatoshi Yoshida, Kazuhisa Saito,
and Michiaki Nakajima, Kitajima-machi, Itano-gun,
Japan, assignors to Toho Rayon Kabushiki Kaisha,
Tokyo, Japan, a corporation of Japan
Filed Dec. 28, 1960, Ser. No. 78,945
Claims priority, application Japan, Mar. 16, 1960,
35/8,274
1 Claim. (Cl. 260—29.6)

The present invention relates to a process for the manufacture of acrylonitrile polymer solution by polymerizing acrylonitrile with or without copolymerizable monomers in an aqueous solvent containing zinc chloride as principal constituent, where hydrogen peroxide is effectively used with some accelerators.

Hitherto, it has been well-known that in order to prepare polymer solution including only polyacrylonitrile or polymers including acrylonitrile as a principal constituent in a solvent capable of dissolving both of these polymers and monomers, for example, an aqueous zinc chloride solution. To accomplish this process, so-called "solution polymerization," various types of polymerization initiators have been used by trial.

However, in order to make the process more valuable industrially, it is positively requested that the process enables to prepare mouldings with a high degree of whiteness, such as fibers, from a colorless, clear, transparent solution of polymer without any defects, such as contamination of solvent due to the decomposition of polymerization catalysts, accumulation of insoluble substances and coloring of polymer solution and that the process has, in addition, merits to recover and purify the solvent easily. Most well-known processes where so-called Redox initiator i.e. a combination of the persulfate with a suitable reducing agent, such as an organic amine, formaldehyde sodium sulfoxlate, or sodium bisulfite are available, are too unsatisfactory to fulfill the above mentioned requirements. In such cases, the polymer solution becomes colored and recovery of solvent is extremely complicated due to impurities formed. On the contrary, such unsatisfactoriness can be removed by using hydrogen peroxide, chloric acid or perchloric acid independently, because $H_2O_2$ decomposes into $O_2$ and $H_2O$, while $HClO_3$ and $HClO_4$ decompose respectively into $O_2$ and $HCl$. However, this process also has disadvantages, such that the polymerization reaction is extremely slow or the introduction period is too long, or the relative conversion is too low, which are very unfavorable from the standpoint of industrial scale of production.

The present inventors have attained a surprisingly important information as follows, as a result of the various investigations.

Namely, in the polymerization of acrylonitrile or monomer mixture mainly containing acrylonitrile in an aqueous solvent containing zinc chloride as a principal constituent by using hydrogen peroxide, it has been ascertained that when hydrochloric acid or phosphoric acid ordinarily considered as a decomposition inhibitor for hydrogen peroxide is added, the polymerization is unexpectedly accelerated. In this case, it is astonishing that other acids indicate no significant effect. (Ref. Table No. 1.) On the other hand, it has also been found that the combination of various types of oxygen acids of chlorine with hydrogen peroxide not only alleviates the above mentioned disadvantage but the polymerization reaction is remarkably accelerated. Moreover, in the case of hydrochloric acid or phosphoric acid, adequate additional amounts are in the range of 0.25 to 4% in net weight for solvent solution. Either below 0.25% or above 4%, the effect is reduced, while it is desirable that the effective amount of oxygen acids of chlorine should be from 0.1 to 10.0 moles per mole of hydrogen peroxide, and moreover, that the total weight of hydrogen peroxide and oxygen acids of chlorine should be from 0.1 to 10.0% by weight of monomers to be polymerized. Furthermore, in this case contrary to the case, of oxygen acids of chlorine alone, no coloration occurs in the polymer solution.

Figure 2:
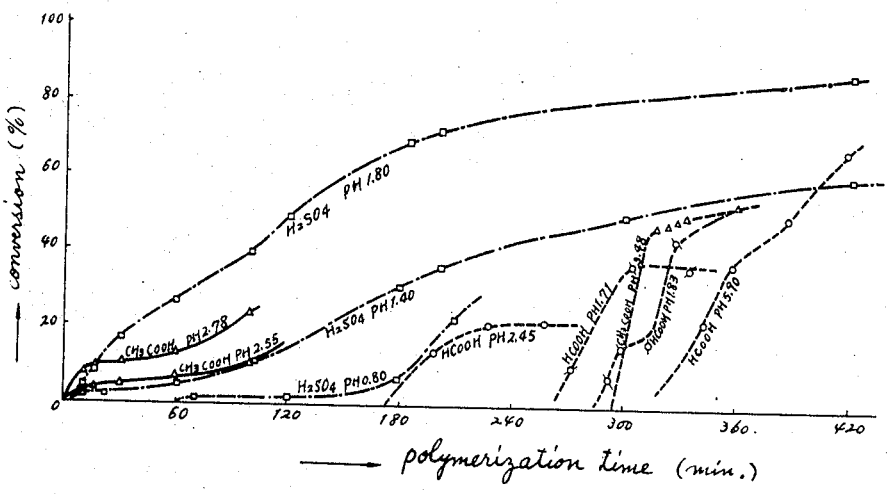

The effects of several acids on polymerization are shown in Table 1 and FIG. 1 and FIG. 2, where the polymerization is performed at 60° C. with a monomer solution prepared by mixing 10 parts of acrylonitrile with 90 parts of 60% aqueous zinc chloride solution, to which 1.5 parts of $H_2O_2$ is added. In table, average molecular weights are those calculated by Staudinger's formula:

$$\eta sp/c = 2.83 \times 10^{-5} \times \overline{M}$$
$\eta sp =$ Specific viscosity
($\overline{M} =$ Average molecular weight)

TABLE 1

| Kind of acid added | Net additional acid/solvent (weight percent) | Time of polymerization (min.) | Relative conversion degree | Molecular weight |
|---|---|---|---|---|
| None | (0.00%) | ∞ | 0 | 0 |
| HCl | 0.75 | 420 | 77.1 | 45,584 |
|  | 0.77 | 60 | 93.0 | |
|  | 1.0 | 180 | 70.1 | 192,450 |
|  | 3.0 | 580 | 27.1 | 44,535 |
| AcOH | 0.45 | ∞ | 0 | 0 |
|  | 1.0 | 360 | 54.9 | 69,109 |
|  | 3 | 100 | 24.0 | 36,393 |
|  | 5 | 100 | 12.7 | 29,110 |
| Formic acid | 1 | 260 | 21.9 | 59,402 |
|  | 3 | 330 | 44.8 | 104,380 |
|  | 5 | 335 | 37.9 | 93,971 |
| Phosphoric acid | 0.5 | 100 | 49.3 | 99,943 |
|  | 1.25 | 280 | 49.6 | 134,275 |
|  |  | 420 | 73.3 | 9,014 |
| Sulfuric acid | 0.5 | 200 | 73.8 | 225,045 |
|  | 0.75 | 420 | 61.1 | 120,091 |
|  | 1.0 | 200 | 23.5 | 270,660 |

Table 2, shown as follows, represents the relation between $x$-value in oxygen acids $HClO_x$ ($x=4, 3, 2$ or $1$) used with hydrogen peroxide as initiator, and the time (hours) which has been taken to attain the ball-fall viscosity, 20 seconds at 60° C., of the polymer solution, which is prepared by adding to 90 parts aqueous solution comprising 40% zinc chloride and 20% sodium chloride, 10 parts monomer of a composition containing acrylonitrile and methyl acrylate in 9:1, and 0.1 part of the initiator composed of hydrogen peroxide and the above mentioned oxygen acids, $HClO_x$, and by heating at 60° C. Here, for example the polymer solution showing the ball-fall viscosity 20″ at 60° C. is obtained by dissolving polyacrylonitrile of Staudinger's molecular weight: 53,000 in 10% concentration in the above mentioned solvent. The present inventors have ascertained that this polymer solution is one of the most suitable solutions for moldings such as fibers.

TABLE 2

| $\frac{HClO_x}{H_2O_2}$ | 0 (i.e. $H_2O_2$ only) | 0.4 | 1.0 | 3.0 | 10.0 | 20.0 | ∞ (i.e. $HClO_x$ only) |
|---|---|---|---|---|---|---|---|
| X=4 | Above 10 | 3 | 1 | 2 | 3 | 8 | Above 10. |
| 3 | do | 2 | 1 | 1 | 3 | 3 | Do. |
| 2 | do | 3 | 3 | 4 | 4 | (¹) | No polymerization. |
| 1 | do | 3 | 3 | 4 | 4 | | |

¹ Almost no polymerization.

Moreover, in this case it is found that not only oxygen acids of chlorine but their metallic salts also shows similar effects. It should be desirable that the metallic ions of those salts are preferably the same as those of the inorganic salts of which the solvent is consisted, for the reason that the decomposition products from these salts should give no unfavorable effects on the recovery of the solvent.

The present invention provides a new process of solution-polymerization, based on the above described teachings. However, in order to carry out this solution-polymerization process advantageously on industrial scale, it is effective to adopt the following polymerization process.

This will now be described in further detail. The polymerization initiators above described frequently generate a large quantity of the decomposition gas (consisting mainly of oxygen), which is included in the polymer solution, and can not readily be eliminated even in a long continuous defoaming operation, and moreover, a careless polymerization frequently grows insoluble gel-like substance. In the production of the polymer solution on industrial scale based on the abovementioned new teachings, these troubles would disturb the adaptation of the transparent colorless polymer solution prepared in constant quantity for moulding operation, such as spinning, with high efficiency. Namely, according to the present inventors' investigation, since hydrogen peroxide readily decomposes to generate gases in an aqueous solution containing zinc chloride as a principal constituent, the mixing of hydrogen peroxide in a solvent solution prior to polymerization causes the resulting polymer solution not only to occlude many foams, but also the given concentration of the initiators can not be maintained and the state of polymerization results in losing reproducibility. The same thing can be said also in the case of oxygen-acids of chlorine. On the other hand, when those initiators are added to a solvent solution containing monomers and left as it is, an undesirable polymerization will proceed even at room temperature to cause insoluble high molecular substances to occur. In order to avoid these difficulties, it has been observed that when the mixture is prepared with the solvent, monomers and initiator, then without delay is polymerized at a given temperature, the better results have been obtained but still not perfect. This point has further been studied and found that the foamation is not merely due to decomposition of initiator and the formation of insoluble gel-like substance is not merely due to undesirable polymerization. In particular, the occurrence of foams is caused by the gasification of residual monomers, especially acrylonitrile, during the course of thermal polymerization, and by involving gases in the vacant space of the polymerization vessel by stirring viscous liquid during polymerization for making uniform solution. One the other hand, the formation of insoluble gel-like substances is due to the fact that in the reaction system the water and residual monomer, those which evaporate in the vacant space and condense on the inner wall of the vessel, drop into the polymer solution and cause its local coagulation.

It is found that gasification of the monomers is possible to be suppressed by giving some pressure to the reaction system and that the involving of gases is possible to be removed by filling up the vessel with the polymer solution. The following Table 3 represents the superiority in the deformation process of the polymer solution prepared by solution-polymerization under pressure without any vacant space in the vessel according to the above-mentioned informations, as compared with other solution-polymerization process.

TABLE 3

|   | Polymerization temperature, °C. | Pressure | Time required for defoamation, hrs. |
|---|---|---|---|
| A | 60 | Normal pressure | 40 |
| B | 60 | 2 kg./cm.$^2$ | 12 |
| C | 60 | do | 0 |

A—In case of usually known process.
B—In case of polymerization in a pressured vessel.
C—In case of the process according to the present invention.

Thus, according to this process, no water vapor is generated, and accordingly formation of insoluble gel-like substances can be avoided. Namely, as described above the present inventors have proceeded the investigations from the standpoint of industry. As the result, foamless spinning solution can be manufactured, and the polymerization process can be continuously combined with the spinning process, thereby the conventional system, which is divided into several processes—polymer production, polymer dissolution, filtration, defoamation and spinning, respectively—can be extremely simplified. Thus, the present inventors have succeeded in acquiring unexpected economical advantages in industry, particularly such as saving of construction expenses, preventing loss of intermediates, maintaining uniformity in quality of products, shortening of the operation time and saving of labor.

In short, the present invention offers an entirely new and industrially surprising process, based on the above described teachings, to provide a foamless, colorless, transparent polymer solution which is prepared by solution polymerization of acrylonitrile or monomer mixture containing acrylonitrile as a principal constituent in aqueous salt solution mainly containing zinc chloride, with hydrogen peroxide as an initiator and which is spinnable immediately after the polymerization process.

In the realization of the present invention, not only an aqueous solution containing zinc chloride alone but also aqueous solutions which contain zinc chloride as a principal constituent, mixed with some inorganic salts (such as sodium chloride, ammonium chloride, magnesium chloride, or calcium chloride), or mixed with some organic compounds (such as alcohols, ketones or nitriles) in such mutual proportions that both the monomers and the polymer can be dissolved, may be used.

The monomers available with acrylonitrile are allyl alcohol, vinyl acetate, methacrylamide, acrylamide, methacrylonitrile, methacrylic acid, acrylic acid, itaconic acid, methacrylic acid esters, acrylic acid esters, vinyl imidazols, vinyl pyridines, ethylene sulfonic acid and its metallic salts, allyl sulfonic acid and its metallic salts, but, of course, available monomers should be not necessarily those materials only.

*Example 1*

In 90 parts of 60% aqueous zinc chloride solution, 1.92 parts of 36% hydrochloric acid, 9 parts of acrylonitrile, 0.7 part of methyl acrylate and 0.3 part of ethylene-sulfonic acid were admixed to obtain a solution. The solution having the above composition was continuously charged in a pressure vessel equipped with a stirrer and combined directly with a spinning device. Keeping the said monomer solution at 60° C., 10% $H_2O_2$ solution was continuously pressed into the vessel through an inlet after the gas in the vessel had been discharged through an overflow hole by filling up the vessel with the monomer solution, in such a way that the concentration of $H_2O_2$ was constantly 0.18% for the weight of the said monomer solution. When the said solution for polymerization was controlled to flow through the vessel in two hours under gauge pressure of 1.7 kg./cm.$^2$, the solution reached directly to spinnerets and was spun out in a coagulating bath comprising 12% aqueous zinc chloride solution as an ordinary wet spinning process and a good fiber was obtained substantially without trouble. Thus produced polymer had a molecular weight of 75,000 and the relative conversion reached 94%. The properties of the fiber obtained: dry strength of 4.1 g./d.; dry elongation of 22.5%; knot strength of 3.2 g./d.; and its dyeability for basic dyes was over 90% under ordinary conditions.

*Example 2*

To 90 parts of 60% aqueous zinc chloride solution were added 0.8 part of phosphoric acid, 9 parts of acrylonitrile and 0.3 part of acrylic acid, and finally added 1.8 parts of 10% hydrogen peroxide solution. Then, a pressure vessel equipped with a stirrer was immediately filled up with the resulting solution, and heated at 60° C. for 200 minutes under the pressure of 5 kg./cm.$^2$ (gauge pressure). Then, a quite clear foamless polymer solution was obtained at a relative conversion of 96% including polymer of molecular weight of 94,500. Then, the said solution is transferred to a spining device and spun out through spinning nozzle in 15% aqueous zinc chloride solution to form a good fiber. The fiber showed a dry strength of 3.6 g./d.; elongation of 30.2%; knot strength of 2.5 g./d. and knot elongation of 20.1%.

*Example 3*

To 90 parts aqueous solution comprising 56% zinc chloride and 4% sodium chloride were added 10 parts of acrylonitrile and 0.16 part of sodium perchlorate monohydrate to obtain a homogeneous solution. Thereupon, 0.60 part of 10% H$_2$O$_2$ aqueous solution was added in the solution and it was immediately heated at 60° C. for 90 minutes, then a perfectly colorless transparent polymer solution was obtained. This solution was transfused to a spinning device wherein it was spun out in a coagulation bath comprising 14% zinc chloride and 1% sodium chloride. Then, it could be spun easily where the molecular weight of the polymer in the spinning solution was 94,000 and the relative conversion reached 95.6%, and the ball-fall viscosity of the polymer solution was 108 seconds at 60° C.

*Example 4*

A pressure vessel as a polymerization apparatus was filled up with a mixture of 89 parts of 60% aqueous zinc chloride solution, 9.9 parts of acrylonitrile and 0.7 part of methyl acrylate. Then, successively the solution having above composition was fed continuously into the vessel maintaining the pressure 3 kg./cm.$^2$ and heated at 40° C. and simultaneously 15% aqueous zinc chlorate solution and 9% aqueous H$_2$O$_2$ solution was pressed into the vessel through other inlets, separately, in such a way that the ratios of said two substances to 100 parts of said monomer solution can be kept 0.75 part and 0.09 part in net weight, respectively. By passing said solution through the polymerization device in 6 hours, a foamless colorless clear solution containing no insoluble substances could be obtained continuously. Thus produced polymer solution showed 83 seconds in ball-fall viscosity, and a relative conversion of 94.5% and the molecular weight of polymer in the solution is 88,900. It could be spun easily by an ordinary method to form a good fiber having the dry strength 3.5 g./d., elongation 31.3%, knot strength 2.7 g./d. and elongation 22.0%.

*Example 5*

To 85 parts of aqueous solution comprising 58% zinc chloride and 4% potassium chloride was added a monomer solution comprising 14 parts of acrylonitrile and 1 part of N-vinyl-4-β-hydroxy-ethyl-imidazol. The resulting monomer solution, 0.32 part of 10% aqueous solution of potassium chlorite and 0.15 part of 10% aqueous solution of hydrogen peroxide were, separately, charged into a vessel as described in Example 1. Maintaining said proportions, the three solutions were continuously fed under the pressure of 0.4 kg./cm.$^2$ being kept any foams out of the polymerization system. The reaction mass passed through the vessel being heated at 70° C. in two hours, then was obtained a transparent and homogeneous polymer solution in which the relative conversion reaches 89% and molecular weight of the polymer reaches 66,000. It had the viscosity of 42 seconds at 60° C., and immediately could be spun to form a good fiber having an excellent dyeing property for acid dyestuffs.

*Example 6*

As in Example 2, 100 parts of aqueous solution comprising 48% zinc chloride and 10% calcium chloride was admixed with 9.5 parts acrylonitrile, 0.5 part butyl acrylate, 0.02 part calcium hypochlorite as well as finally with 0.04 part of 30% hydrogen peroxide aqueous solution, then the resulting solution was charged into a pressure vessel which was heated at 50° C. under the pressure of 2.2 kg./cm.$^2$ for 4 hours. Thus, a transparent foamless polymer solution was obtained, having a ball-fall viscosity of 130 seconds at 60° C., relative conversion of 85% and a molecular weight of 103,000.

What we claim:

In a process for the aqueous solution polymerization of a polymerizable monomer comprising acrylonitrile in in the presence of zinc chloride and hydrogen peroxide, the improvement which comprises conducting said polymerization in the presence of from 0.1–10.0 moles of the salt of an oxygen acid of chlorine per mole of hydrogen peroxide, wherein the total weight of hydrogen peroxide and the salt of the oxygen acid of chloride employed is in the range of from 0.1 to 10.0 weight percent based on said polymerizable monomer, and charging the resulting solution into a pressure vessel.

References Cited by the Examiner

UNITED STATES PATENTS

| 2,777,832 | 1/57 | Mallison | 260—85.5 |
| 2,837,492 | 6/58 | Stanton et al. | 260—29.6 |

MURRAY TILLMAN, *Primary Examiner.*

DANIEL ARNOLD, LEON J. BERCOVITZ, *Examiners.*